United States Patent [19]

Markowski

[11] Patent Number: 4,527,386
[45] Date of Patent: Jul. 9, 1985

[54] DIFFUSER FOR GAS TURBINE ENGINE
[75] Inventor: Stanley J. Markowski, East Hartford, Conn.
[73] Assignee: United Technologies Corporation, Hartford, Conn.
[21] Appl. No.: 470,369
[22] Filed: Feb. 28, 1983
[51] Int. Cl.³ .................................................. F02C 3/14
[52] U.S. Cl. .................................. 60/39.36; 60/751
[58] Field of Search ............... 60/39.32, 39.36, 39.37, 60/751

[56] References Cited
U.S. PATENT DOCUMENTS

| | | | |
|---|---|---|---|
| 2,746,246 | 5/1956 | Valota | 60/39.37 |
| 3,290,880 | 12/1966 | Poyser | 60/39.36 |
| 3,364,678 | 1/1968 | Alford | 60/751 |
| 3,826,084 | 7/1974 | Branstrom et al. | 60/751 |

FOREIGN PATENT DOCUMENTS 205220  5/1956  Australia ............... 60/751

Primary Examiner—Louis J. Casaregola
Attorney, Agent, or Firm—Norman Friedland

[57] ABSTRACT

A diffuser system for a gas turbine engine includes a prediffuser and a piping system that diverts the flow into two streams. One stream captures the prediffuser discharge air at the center of the gas path where the total pressure is at its highest level and provides an additional stage of diffusing before dumping it around the burner to supply liner cooling air, turbine cooling air and if necessary, small amounts of dilution air to trim radial temperature profile. The other stream is ducted directly into the burner avoiding the typical dump diffuser losses.

2 Claims, 3 Drawing Figures

DIFFUSER FOR GAS TURBINE ENGINE

TECHNICAL FIELD

This invention relates to gas turbine engines and particularly to the diffuser portion located downstream of the compressor for feeding air to the burner.

BACKGROUND ART

As is exemplified in the JT9D gas turbine engine manufactured by the Pratt & Whitney Aircraft Group of United Technologies Corporation, the assignee of this patent application and which is incorporated herein by reference, a prediffuser and dump diffuser are disposed downstream of the compressor feeding compressor discharge air to the burner. Typically, compressor air is discharged into the prediffuser which serves to convert a portion of the dynamic pressure head to static pressure whereupon it is then dumped into the dump diffuser for additional conversion, but with high pressure losses. A portion of the now slower moving air is admitted internally of the burner liner to the combustion zones while an additional portion is utilized to cool the liner itself. Because the air is admitted from the periphery and must flow radially toward the center, it is typical to re-accelerate the portion of the air being used in the burner for combustion and dilution purposes with a concomitant pressure drop across the holes in the burner walls. Obviously, there is an associated pressure loss accompanying this type of system.

I have found that I can reduce the pressure losses by discharging the air from the prediffuser into two streams. One stream provides an additional diffuser stage then ducts the air with reduced losses to and around the burner to supply liner cooling air, turbine cooling air and if necessary, small amounts of dilution air to trim the radial temperature profile. The other stream is ducted without the usual dump loss directly into the front end of the burner and supplies the combustion and dilution air. This latter stream without its usual large dump loss and its low loss front feed, has the ability to absorb substantial loss penalties and still provide for a low overall burner pressure loss. This capability is utilized to minimize the pressure losses in the heretofore utilized cooling air circuit.

This invention contemplates that the compressor discharge air leaving the diffuser for feeding the burner shrouds for liner and turbine cooling is captured from the center of the gas path where the total pressure is highest. The ducts that capture this air have expanding cross-sectional areas and commence with zero boundary layer at their walls, and thus function as an additional diffuser stage, further reducing the dynamic pressure head and discharging this cooling air into the burner shroud region with a substantially reduced dump loss. The combination of capturing the highest total pressure from the center of the gas path and the introduction of a second diffuser stage to suppress the dump loss, makes the final total pressure level of the cooling air circuit substantially higher than that of current burner systems. The remaining air not intercepted by the capturing ducts, (the remainder of the high total pressure center region air and all the boundary layer air adjacent to the walls of the prediffuser) is collected by a number of transition sections into discrete pipes where the air is delivered to and into the front end of the burner as combustion and dilution air without the usual diffuser dump loss. Tests that have been conducted have shown that this front-feed combustion and dilution air concept has proven itself to be a low loss burner system.

DISCLOSURE OF INVENTION

An object of this invention is to provide an improved diffuser system for a gas turbine engine adapted to power aircraft.

A feature of this invention is to capture the air at the center of the gas path leaving the diffuser where the total pressure is highest and make it pass through an additional diffuser stage thereby minimizing the dump loss and enhancing the total pressure level of the cooling air at the expense of the remaining air. The lower total pressure air which incurred losses within the prediffuser and the noncaptured air is then directed directly into the burner without the necessity of flowing through a dump diffuser.

Other features and advantages will be apparent from the specification and claims and from the accompanying drawings which illustrate an embodiment of the invention.

BEST MODE FOR CARRYING OUT THE INVENTION

Figure 1:
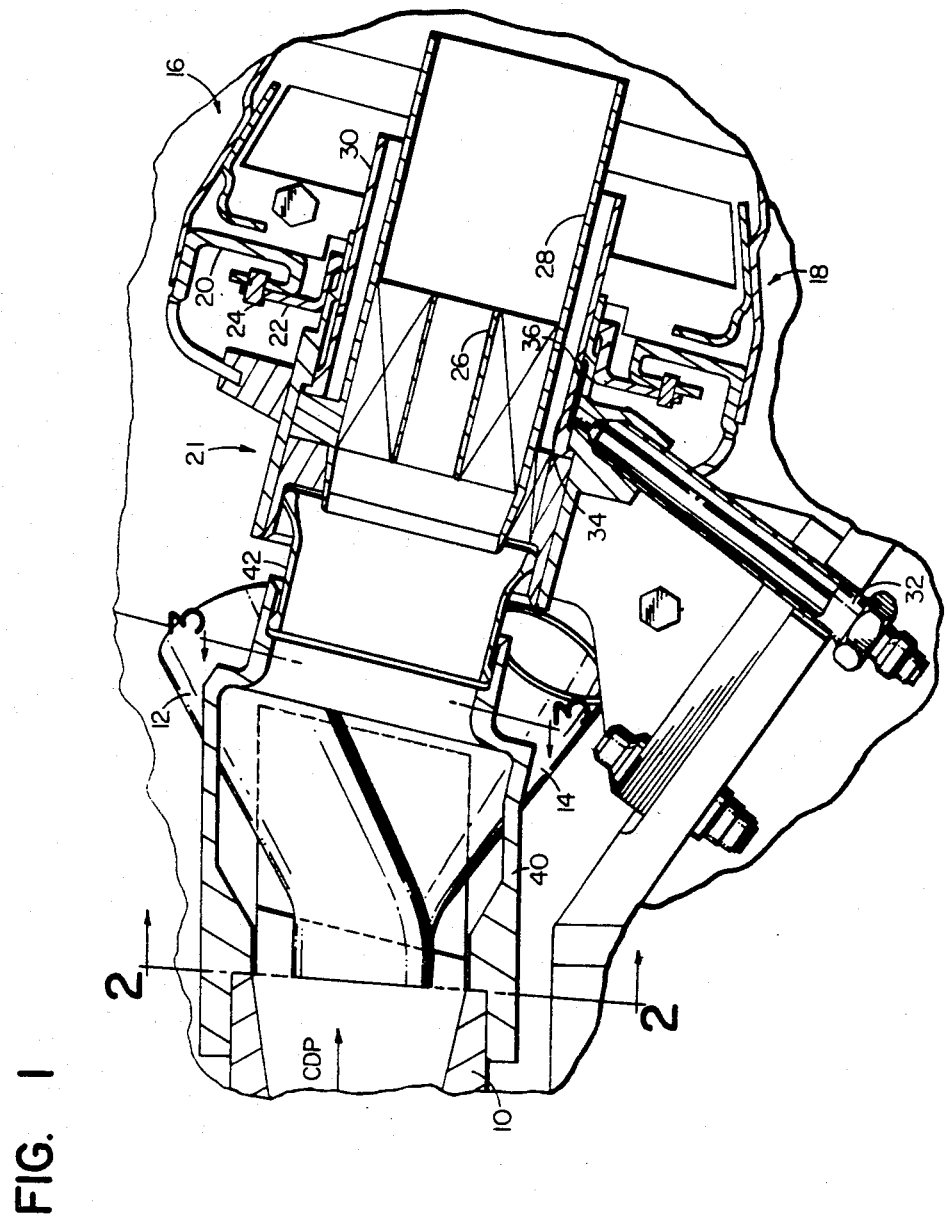
FIG. 1 is a side cutaway partial view showing the streams from the diffuser leading air to the burner shrouds and burner combustion zone.

For the sake of convenience and simplicity only that portion of the engine that illustrates the diffuser system and the gas path to the burner is shown, as the remaining portion of the engine is well known and is not part of this invention. Suffice it to say that the air discharging from the compressor (CDP) is fed into the diffuser generally indicated by reference numeral 10 which is annular in shape where the air is efficiently diffused and separated into basically two streams. For the purposes of this disclosure, one stream consists of capturing the air at the center of the diffuser for feeding the burner shrouds for liner and turbine cooling and the other stream captures the remaining portion for feeding combustion and dilution air to the burner. Obviously, a plurality of pipes are discretely mounted about the circumference of the diffuser to achieve the proper air feeding and distribution pattern necessary for a given engine design.

As best seen in FIG. 1, compressor discharge air in the diffuser 10 at the discharge end is captured by pipes 12 and 14 one bending in an upward direction and the other bending in a downward direction, each pipe having an expanding cross section to provide a second diffuser stage before dumping air in the cavity surrounding the burner liners generally indicated by reference numerals 16 and 18. Both pipes 12 and 14 are configured so that at the bend and in close proximity thereto the cross-sectional area stays constant. Downstream of the bend the inner diameter begins to increase flaring to a larger cross-sectional area at the discharge end forming a cone portion which defines the second diffuser stage. As is apparent from the foregoing the process of additional diffusion of the air captured at the point of highest static pressure achieves a higher total pressure further downstream in the engine that would have otherwise been obtained and minimizes the net pressure losses that would otherwise occur had the prediffused air been dumped in a large volume cavity or dump diffuser as is heretofore provided. This assures that the air being delivered to the first turbine vane shower head for turbine cooling purposes is at the highest possible total pressure.

As is conventional in this burner construction, the burner liner comprises a plurality of louver sections joined together to form an inner and outer wall for defining an annular burning section which surrounds the engine shaft (not shown). This defines an annular combustor which is closed on the front end by the dome member 20. In this embodiment a plurality of air or fuel/air admission modules 21 (one being shown) is mounted in apertures formed on the front end of the dome. The air or fuel/air admission module is supported to the dome by the upstanding heat shield member 22 which is clamped by clamp 24 to the arm of the U-shaped dome member 20.

The major portion of the air enters the burner through this module which comprises a pair of concentric tubes 26 and 28 for defining the secondary airflow which serves as the combustion and dilution air. Suitable vanes may be employed to impart a swirling motion to the incoming air . Another concentric tube 30 radially spaced from the tube 28 defines an annular passage for the primary air. Fuel through pipe 32 may be admitted into the primary passageway through annulus 34 and a plurality of apertures 36 formed about the circumference of tube 30.

The flow discharging from the diffuser 10 is picked up directly by the transistion section 40 and into tubular connections 42 for feeding the primary and secondary airflow of the air or fuel/air injector module 21. The pipes 12 and 14 are located relative to the diffuser discharge end to capture the air from the center of the gas path because it has the highest total pressure.

Figure 2:
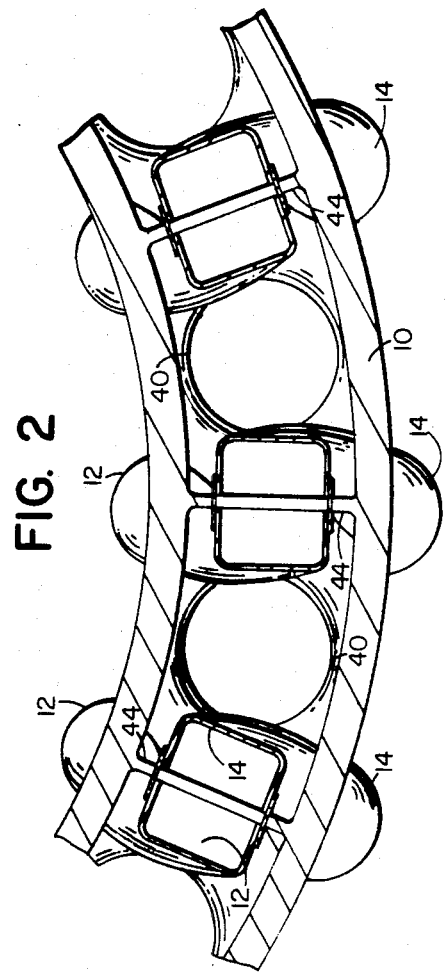
FIG. 2 is a partial view taken along line 2—2 of FIG. 1 looking into the pipe stream at the discharge end of the diffuser.
Figure 3:
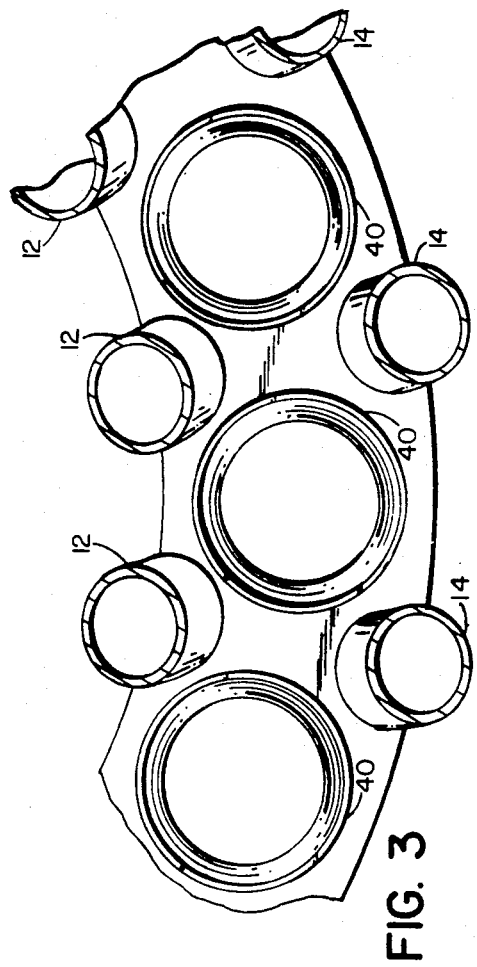
FIG. 3 is a partial view of FIG. 1 looking into the pipe stream taken along line 3—3 of FIG. 1.

As shown in FIGS. 2 and 3 the pipes 12 and 14 at the discharged end of the diffuser are shaped rectangularly and flare to a circular cross section and then to a conical diffuser stage and are supported by support member 44. Since the air leaving the diffuser is captured at a point away from the walls of the diffuser, this captured air has the highest total pressure since the losses are near the wall in the boundary layer air. This air is utilized for burner liner cooling, turbine cooling and if necessary, for trimming the radial temperature profile.

In addition to eliminating the dump diffuser loss, this invention by a judicious piping arrangement affords the opportunity of eliminating the wake problem associated with struts generally utilized in the diffuser. In the arrangement, additional pipes (with second diffuser stage) are contemplated. This, of course, would reduce the length of the pipe-diffusers for the same area ratio and cone angle of a lesser number pipe-diffuser installation.

It should be understood that the invention is not limited to the particular embodiments shown and described herein, but that various changes and modifications may be made without departing from the spirit and scope of this novel concept as defined by the following claims.

I claim:

1. In combination with an annular burner having an inner and outer liner defining an annular combustion chamber, a dome interconnecting said inner and outer liner for covering the front end of said annular combustion chamber, a plurality of air injectors mounted on apertures circumferentially formed around the front end of said dome, each of said air injectors having a first straight through central passageway for leading compressor discharge air in the central portion of the annular space of said annular combustion chamber for defining the secondary flow of combustion and dilution air, an annular straight through passage defining a second passageway concentric with said first passageway for leading the compressor discharge air into the annular space of said annular combustion chamber, a diffuser feed system having an annular prediffuser, a plurality of first pipes having a conical portion flaring from a smaller to larger diameter in the direction of flow for effectuating diffusion of the air stream for leading high total pressure diffused air in a cavity surrounding said annular combustion chamber, and a straight through pipe collecting air adjacent the boundary of said prediffuser connected to the front of each of said air injector and said first pipes connected to the discharge end of said prediffuser but spaced from said boundary layer to deliver solely the air with the higher total pressure of the air in said prediffuser.

2. In combination as in claim 1 including means for admitting fuel in each of said air injectors to mix with the air flowing therethrough.

* * * * *

UNITED STATES PATENT AND TRADEMARK OFFICE
CERTIFICATE OF CORRECTION

PATENT NO. : 4,527,386
DATED : July 9, 1985
INVENTOR(S) : Stanley J. Markowski

It is certified that error appears in the above-identified patent and that said Letters Patent is hereby corrected as shown below:

Column 1, line 3, insert

--Cross Reference

This invention relates to the invention disclosed in copending patent application entitled COMBUSTOR, and filed by S. J. Markowski on even date and assigned to the same assignee of this application.

Column 4, line 1, "wall" should be --walls--.

Signed and Sealed this

First Day of October 1985

[SEAL]

Attest:

Attesting Officer

DONALD J. QUIGG

Commissioner of Patents and Trademarks—Designate